United States Patent
Saito et al.

(10) Patent No.: US 12,352,016 B2
(45) Date of Patent: Jul. 8, 2025

(54) INFORMATION OBTAINING SYSTEM AND INFORMATION OBTAINING METHOD

(71) Applicant: KOMATSU LTD., Tokyo (JP)

(72) Inventors: Naoto Saito, Tokyo (JP); Shunsuke Goto, Tokyo (JP); Keisuke Tsuboi, Tokyo (JP)

(73) Assignee: KOMATSU LTD., Tokyo (JP)

(*) Notice: Subject to any disclaimer, the term of this patent is extended or adjusted under 35 U.S.C. 154(b) by 167 days.

(21) Appl. No.: 18/008,251

(22) PCT Filed: Nov. 2, 2021

(86) PCT No.: PCT/JP2021/040359
§ 371 (c)(1),
(2) Date: Dec. 5, 2022

(87) PCT Pub. No.: WO2022/107589
PCT Pub. Date: May 27, 2022

(65) Prior Publication Data
US 2023/0203791 A1  Jun. 29, 2023

(30) Foreign Application Priority Data

Nov. 17, 2020 (JP) .................. 2020-190726

(51) Int. Cl.
*E02F 9/20* (2006.01)
*E02F 9/26* (2006.01)

(52) U.S. Cl.
CPC .............. *E02F 9/264* (2013.01); *E02F 9/261* (2013.01)

(58) Field of Classification Search
CPC .................. E02F 9/264; E02F 9/261
(Continued)

(56) References Cited

U.S. PATENT DOCUMENTS

2013/0158788 A1  6/2013  Seki
2015/0039189 A1  2/2015  Wu
(Continued)

FOREIGN PATENT DOCUMENTS

CN    105339558 A    2/2016
CN    107882103 A    4/2018
(Continued)

OTHER PUBLICATIONS

Kinki Technical Office, Kinki Regional Development Bureau, Ministry of Land, Infrastructure, Transport, and Tourism, "Mashin Gaidansu Gijutsu (Bakkuhou hen) no Tebiki Sho (Guide for Machine Guidance Technology (Backhoe))," Mar. 2014, p. 29.

*Primary Examiner* — Mahmoud S Ismail
(74) *Attorney, Agent, or Firm* — Faegre Drinker Biddle & Reath LLP

(57) ABSTRACT

Information on a work machine is more accurately obtained through simplified works. An information obtaining system includes a hydraulic excavator, a target portion, a position measurement unit, and an information obtaining unit. The hydraulic excavator includes a revolving unit and a work implement movable relatively to the revolving unit. The target portion is attached to the work implement. The position measurement unit continuously measures positions of the target portion that moves with movement of the work implement relative to the revolving unit. The information obtaining unit obtains three-dimensional information on the hydraulic excavator based on a track of the target portion obtained by measurement.

12 Claims, 7 Drawing Sheets

(58) Field of Classification Search
 USPC .......................................................... 701/50
 See application file for complete search history.

(56) References Cited

U.S. PATENT DOCUMENTS

| | | |
|---|---|---|
| 2016/0193920 A1 | 7/2016 | Tsubone et al. |
| 2016/0281331 A1* | 9/2016 | Ikegami ................ E02F 9/2285 |
| 2020/0399862 A1* | 12/2020 | Okazaki .................. E02F 3/384 |
| 2020/0407952 A1 | 12/2020 | Yamanaka et al. |
| 2021/0254312 A1 | 8/2021 | Oi et al. |
| 2022/0145584 A1* | 5/2022 | Fujiwara ................ E02F 3/437 |
| 2023/0183948 A1* | 6/2023 | Noda ....................... E02F 9/265 |
| | | 701/34.2 |
| 2023/0392353 A1* | 12/2023 | Nishimura .............. E02F 3/435 |

FOREIGN PATENT DOCUMENTS

| | | |
|---|---|---|
| CN | 110409528 A | 11/2019 |
| CN | 110565711 A | 12/2019 |
| CN | 111819333 A | 10/2020 |
| JP | H06-313327 A | 11/1994 |
| JP | 2009-287298 A | 12/2009 |
| JP | 2012-202061 A | 10/2012 |
| JP | 2014-129676 A | 7/2014 |
| JP | 2019-020348 A | 2/2019 |
| JP | 2019-178608 A | 10/2019 |
| JP | 2020-033836 A | 3/2020 |
| WO | WO-2020/044845 A1 | 3/2020 |

\* cited by examiner

INFORMATION OBTAINING SYSTEM AND INFORMATION OBTAINING METHOD

CROSS-REFERENCE TO RELATED APPLICATIONS

This application is a National Stage Entry of International Patent Application No. PCT/JP2021/040359, filed Nov. 2, 2021, which claims the benefit of priority to Japanese Patent Application No. 2020-190726, filed Nov. 17, 2020, the entire contents of each of which are incorporated herein by reference.

TECHNICAL FIELD

The present disclosure relates to an information obtaining system and an information obtaining method for obtaining information on a work machine.

BACKGROUND ART

Information-oriented construction realizes highly efficient and highly accurate constructions by utilizing information communication technology (ICT) in constructions in earth-moving projects. By way of example of an information-oriented construction technology, a machine guidance technology that enables obtainment of a position of a work machine with the use of a positioning apparatus such as a total station or global navigation satellite systems (GNSS) and provides information on a difference between design data of a construction location and current topography data to a monitor at an operator's seat of the work machine has been proposed.

A hydraulic excavator represents one of work machines. The hydraulic excavator may include a work implement constituted of a boom, an arm, and a bucket. The boom, the arm, and the bucket may sequentially pivotably be supported by pins. For constructions based on the machine guidance technology, NPL 1 describes measurement of a dimension between pins in movable portions such as a dimension of the arm and a dimension of the bucket of an ICT hydraulic excavator.

CITATION LIST

Non Patent Literature

NPL 1: Kinki Technical Office, Kinki Regional Development Bureau, Ministry of Land, Infrastructure, Transport, and Tourism, "Mashin Gaidansu Gijutsu (Bakkuhou hen) no Tebiki Sho (Guide for Machine Guidance Technology (Backhoe))," March 2014, p. 29

SUMMARY OF INVENTION

Technical Problem

In order to calculate a dimension between pins based on a result of measurement of a position of each pin in a work implement in a work machine with the use of a total station or the like, a measurement target should be attached to the position of each pin. Works for attaching this measurement target are complicated, and in addition, accuracy of attachment is not ensured because the measurement target is manually attached to each pin.

The present disclosure proposes an information obtaining system and an information obtaining method that allow more accurate obtainment of information on a work machine for information-oriented constructions through simplified works.

Solution to Problem

According to the present disclosure, an information obtaining system is proposed. The information obtaining system includes a work machine, a target portion, a position measurement unit, and an information obtaining unit. The work machine includes a base portion and a movable portion movable relatively to the base portion. The target portion is attached to the movable portion. The position measurement unit continuously measures positions of the target portion that moves with movement of the movable portion relative to the base portion. The information obtaining unit obtains three-dimensional information on the work machine based on a track of the target portion obtained by measurement.

According to the present disclosure, an information obtaining method of obtaining three-dimensional information on a work machine is proposed. The work machine includes a base portion and a movable portion movable relatively to the base portion. A target portion is attached to the movable portion of the work machine. The information obtaining method includes processing below. First processing is to move the movable portion relatively to the base portion. Second processing is to continuously measure positions of the target portion that moves with movement of the movable portion relative to the base portion. Third processing is to obtain the three-dimensional information on the work machine based on a track of the target portion obtained by measurement.

Advantageous Effects of Invention

According to the information obtaining system and the information obtaining method according to the present disclosure, information on the work machine can more accurately be obtained through simplified works.

DESCRIPTION OF EMBODIMENTS

Figure 1:
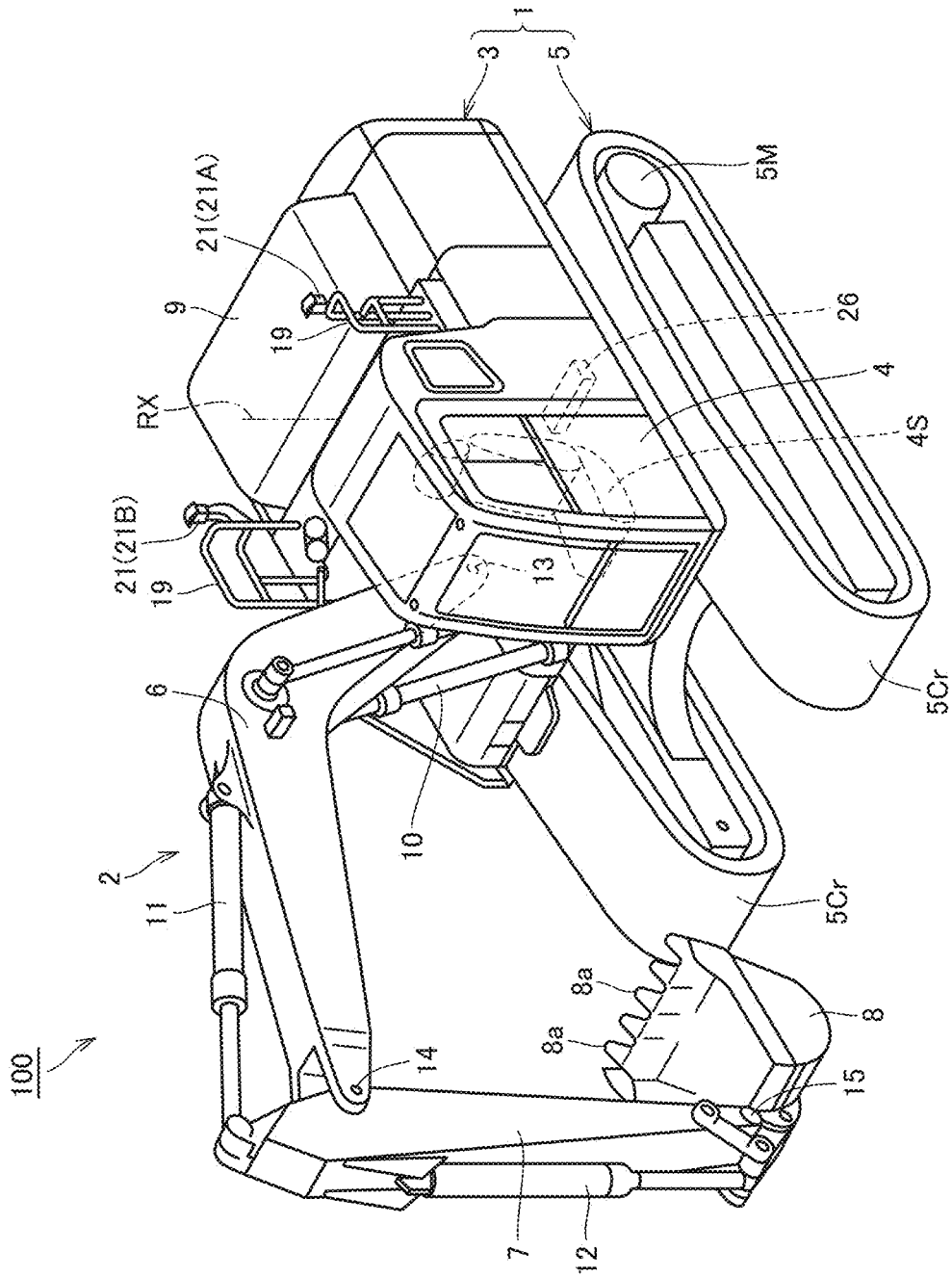
FIG. 1 is a diagram of appearance of a hydraulic excavator.

An embodiment will be described hereinafter with reference to the drawings. In the description below, the same elements have the same reference characters allotted and their labels and functions are also the same. Therefore, detailed description thereof will not be repeated.

FIG. 1 is a diagram of appearance of a hydraulic excavator 100 by way of example of a work machine, information on which is obtained by an information obtaining system and an information obtaining method based on the embodiment. Hydraulic excavator 100 will be described by way of example of the work machine in the embodiment.

As shown in FIG. 1, hydraulic excavator 100 includes a main body 1 and a hydraulically operated work implement 2. Main body 1 includes a revolving unit 3 and a traveling unit 5. Traveling unit 5 includes a pair of crawler belts 5Cr and a travel motor 5M. Travel motor 5M is provided as a drive source for traveling unit 5. Travel motor 5M is a hydraulically operated hydraulic motor.

When hydraulic excavator 100 operates, traveling unit 5 or more specifically crawler belt 5Cr is in contact with the ground. Traveling unit 5 can travel on the ground as crawler belts 5Cr rotate. Traveling unit 5 may include wheels (tires) instead of crawler belts 5Cr.

Revolving unit 3 is arranged on traveling unit 5 and supported by traveling unit 5. Revolving unit 3 is movable relatively to traveling unit 5. Revolving unit 3 is mounted on traveling unit 5 as being revolvable with respect to traveling unit 5, around an axis of revolution RX. Revolving unit 3 is attached on traveling unit 5 with a revolving circle portion being interposed. The revolving circle portion is arranged substantially in a central portion of main body 1 in a plan view. The revolving circle portion is generally in an annular shape, and includes an inner tooth for revolution on an inner circumferential surface. A pinion that meshes with this inner tooth is attached to a not-shown revolution motor. As the revolving circle portion rotates by transmission of driving force from the revolution motor, revolving unit 3 can rotate relatively to traveling unit 5.

Revolving unit 3 includes a cab 4. A driver (operator) of hydraulic excavator 100 rides on cab 4 and steers hydraulic excavator 100. Cab 4 is provided with an operator's seat 4S where an operator sits. The operator can operate hydraulic excavator 100 in cab 4. In cab 4, the operator can operate work implement 2, can perform an operation to revolve revolving unit 3 with respect to traveling unit 5, and can perform an operation to travel hydraulic excavator 100 by means of traveling unit 5. Though hydraulic excavator 100 is operated from the inside of cab 4 in the present disclosure, it may wirelessly remotely be operated from a location distant from hydraulic excavator 100.

In the embodiment, with the operator seated at operator's seat 4S within cab 4 being defined as a reference, positional relation of each part in revolving unit 3 of hydraulic excavator 100 will be described. A fore/aft direction refers to a fore/aft direction of the operator who sits at operator's seat 4S. A direction in which the operator sitting at operator's seat 4S faces is defined as the fore direction and a direction behind the operator who sits at operator's seat 4S is defined as the aft direction. A lateral direction refers to a lateral direction of the operator who sits at operator's seat 4S. A right side and a left side at the time when the operator sitting at operator's seat 4S faces front are defined as the right direction and the left direction, respectively. An upward/downward direction refers to an upward/downward direction of the operator who sits at operator's seat 4S. A foot side of the operator who sits at operator's seat 4S is referred to as the lower side and a head side is referred to as the upper side.

A side where work implement 2 protrudes from revolving unit 3 in the fore/aft direction is the fore direction and a direction opposite to the fore direction is the aft direction. A right side and a left side of the lateral direction when one faces front are the right direction and the left direction, respectively. A side in the upward/downward direction where the ground is located is defined as a lower side and a side where the sky is located is defined as an upper side.

Revolving unit 3 includes an engine compartment 9 accommodating an engine and a counterweight provided in a rear portion of revolving unit 3. In engine compartment 9, an engine that generates driving force and a hydraulic pump that supplies hydraulic oil to a hydraulic actuator upon receiving driving force generated by the engine are arranged.

In revolving unit 3, a handrail 19 is provided in front of engine compartment 9. An antenna 21 is provided in handrail 19. Antenna 21 is, for example, an antenna for GNSS. Antenna 21 includes a first antenna 21A and a second antenna 21B provided in revolving unit 3 as being distant from each other in the lateral direction.

Work implement 2 is mounted on and supported by revolving unit 3. Work implement 2 includes a boom 6, an arm 7, and a bucket 8. Boom 6 is pivotably coupled to revolving unit 3. Arm 7 is rotatably coupled to boom 6. Bucket 8 is rotatably coupled to arm 7. Bucket 8 includes a plurality of blades. A tip end of bucket 8 is referred to as a cutting edge 8a.

Bucket 8 does not have to include a blade. The tip end of bucket 8 may be formed from a steel plate in a straight shape.

A base end of boom 6 is coupled to revolving unit 3 with a boom foot pin 13 (which will be referred to as a boom pin below) being interposed. A base end of arm 7 is coupled to a tip end of boom 6 with an arm coupling pin 14 (which will be referred to as an arm pin below) being interposed. Bucket 8 is coupled to a tip end of arm 7 with a bucket coupling pin 15 (which will be referred to as a bucket pin below) being interposed. Boom pin 13, arm pin 14, and bucket pin 15 extend substantially in the lateral direction.

Boom 6 is movable relatively to revolving unit 3. Boom 6 is rotatable around boom pin 13 relatively to revolving unit 3. Arm 7 is movable relatively to boom 6. Arm 7 is rotatable around arm pin 14 relatively to boom 6. Bucket 8 is movable relatively to arm 7. Bucket 8 is rotatable around bucket pin 15 relatively to arm 7.

Arm 7 and bucket 8 are integrally movable relatively to boom 6, specifically, rotatable relatively thereto, while bucket 8 does not rotate relatively to arm 7. Boom 6, arm 7, and bucket 8 are integrally movable relatively to revolving unit 3, specifically, rotatable relatively thereto, while bucket 8 does not rotate relatively to arm 7 and arm 7 does not rotate relatively to boom 6. Work implement 2 and revolving unit 3 are integrally movable relatively to traveling unit 5, specifically, rotatable relatively thereto, while work implement 2 does not rotate relatively to revolving unit 3.

Work implement 2 includes a boom cylinder 10, an arm cylinder 11, and a bucket cylinder 12. Boom cylinder 10 drives boom 6. Arm cylinder 11 drives arm 7. Bucket cylinder 12 drives bucket 8. Each of boom cylinder 10, arm cylinder 11, and bucket cylinder 12 is implemented by a hydraulic cylinder driven with hydraulic oil.

Bucket cylinder 12 is attached to arm 7. As bucket cylinder 12 extends and contracts, bucket 8 rotates with respect to arm 7. Work implement 2 includes a bucket link. The bucket link couples bucket cylinder 12 and bucket 8 to each other.

A controller 26 is mounted on hydraulic excavator 100. Controller 26 controls operations of hydraulic excavator 100.

Figure 2:
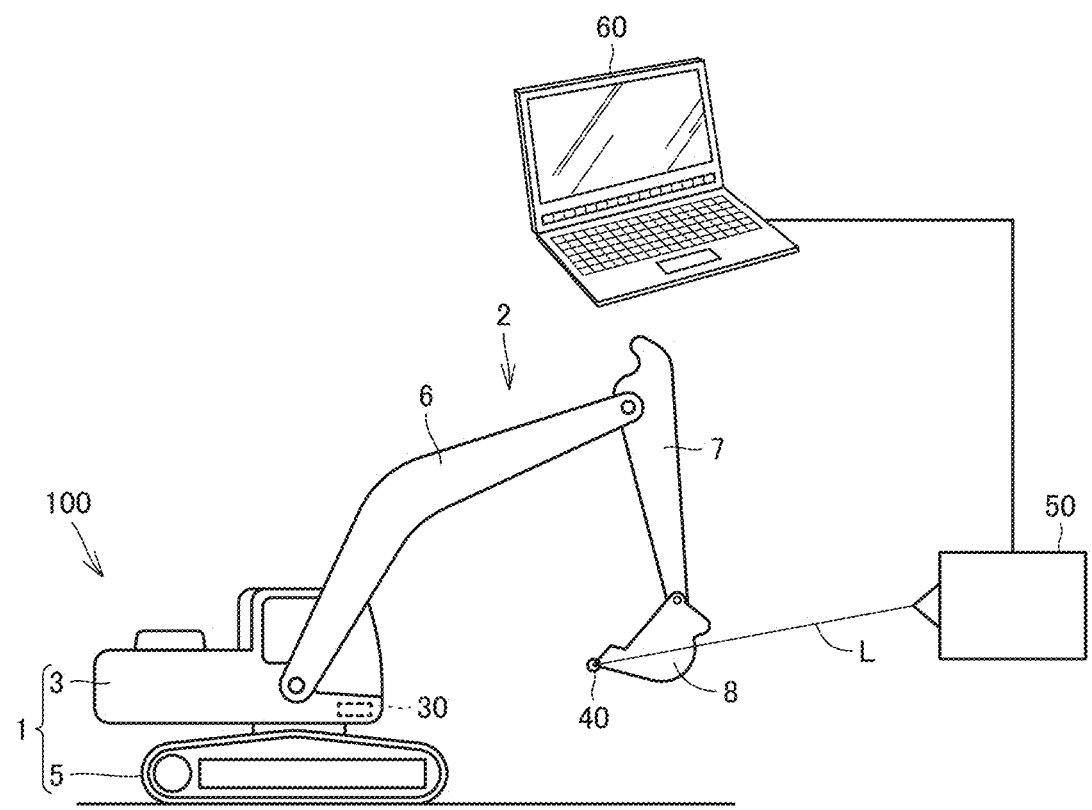
FIG. 2 is a schematic diagram showing a schematic configuration of an information obtaining system based on an embodiment.

FIG. 2 is a schematic diagram showing a schematic configuration of an information obtaining system based on the embodiment. A target portion 40 is attached to hydraulic excavator 100. Target portion 40 is attached to one part of hydraulic excavator 100. In an example shown in FIG. 2, target portion 40 is attached to cutting edge 8a of bucket 8.

The information obtaining system includes a position measurement unit 50. Position measurement unit 50 measures a position of target portion 40. Position measurement unit 50 is implemented, for example, by a laser tracker, and in this case, target portion 40 is implemented by a target reflector.

The laser tracker emits laser beams L to the target reflector. When laser beams L are emitted to the target reflector, the target reflector reflects light in a direction the same as a direction of emission. Reflected light returns to the laser tracker. The laser tracker can find a distance between the laser tracker and the target reflector based on time required for return of laser beams L from the target reflector. The laser tracker itself knows the direction of emission of laser beams L. The laser tracker can find a three-dimensional position of the target reflector based on the direction of emission of laser beams L and the distance to the target reflector.

The laser tracker can continuously measure three-dimensional positions of a moving target reflector at a high sampling rate. The laser tracker can automatically keep track of movement of the target reflector to continuously obtain three-dimensional positions. The laser tracker can thus obtain a track of the moving target reflector. The three-dimensional positions of the target reflector continuously measured at the high sampling rate can be processed as the track of the target reflector.

Position measurement unit 50 should only be able to obtain a three-dimensional position of target portion 40, and it is not limited to the laser tracker. For example, position measurement unit 50 may be implemented by a total station with a function to keep track of target portion 40. Alternatively, position measurement unit 50 may be implemented, for example, by an image pick-up apparatus represented by a stereo camera, and in this case, target portion 40 may be implemented by a marker for facilitating recognition of a position of target portion 40 in a picked-up image. Alternatively, position measurement unit 50 may be implemented, for example, by combination of any goniometer and any rangefinder.

The information obtaining system includes an information obtaining unit 60. Information obtaining unit 60 is provided, for example, on the outside of hydraulic excavator 100. Information obtaining unit 60 can communicate with position measurement unit 50 through wireless or wired communication means. Information obtaining unit 60 is a computer including a central processing unit (CPU), a non-volatile memory, and a timer.

Information obtaining unit 60 obtains three-dimensional information on hydraulic excavator 100 based on the track of moving target portion 40. The three-dimensional information on hydraulic excavator 100 obtained by information obtaining unit 60 includes, for example, a dimension of work implement 2 of hydraulic excavator 100, a plane drawn by a track of work implement 2 that rotates relatively to revolving unit 3, and a plane drawn by a track of revolving unit 3 that rotates relatively to traveling unit 5. The three-dimensional information on hydraulic excavator 100 may be information on a coordinate of a position of a prescribed part of hydraulic excavator 100 in a three-dimensional space, information on a distance between two prescribed parts, or information on a plane defined by a shape or an attitude of hydraulic excavator 100. An international terrestrial reference frame (ITRF) coordinate system may be adopted as the coordinate system of the three-dimensional space.

Figure 3:
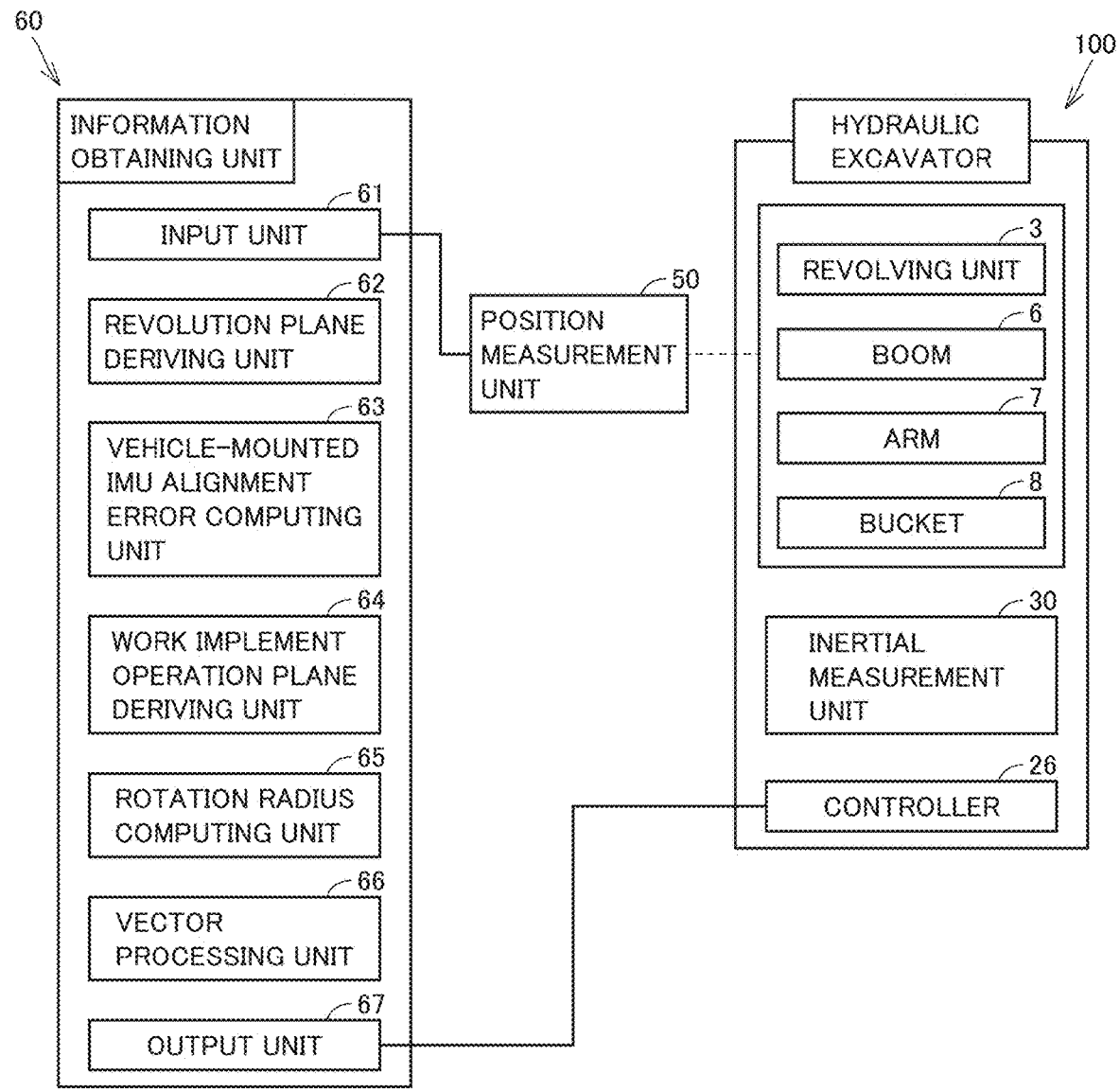
FIG. 3 is a block diagram showing a functional configuration of the information obtaining system.

FIG. 3 is a block diagram showing a functional configuration of the information obtaining system. Hydraulic excavator 100 includes an inertial measurement unit (IMU) 30 in addition to revolving unit 3, boom 6, arm 7, bucket 8, and controller 26 described with reference to FIG. 1. Inertial measurement unit 30 detects an inclination of hydraulic excavator 100. Inertial measurement unit 30 detects an angle of inclination of hydraulic excavator 100 with respect to the fore/aft direction, the lateral direction, and the upward/downward direction. Inertial measurement unit 30 corresponds to an inclination sensor in the embodiment that detects an angle of inclination of the ground where hydraulic excavator 100 is located. Inertial measurement unit 30 is attached at a position in the center in the lateral direction in a front portion of revolving unit 3 as shown in FIG. 2.

Target portion 40 is attached to one part of any one of revolving unit 3 and work implement 2 (boom 6, arm 7, and bucket 8) in hydraulic excavator 100. Position measurement unit 50 measures a three-dimensional position of target portion 40 attached to revolving unit 3, boom 6, arm 7, or bucket 8.

Information obtaining unit 60 includes an input unit 61, a revolution plane deriving unit 62, a vehicle-mounted IMU alignment error computing unit 63, a work implement operation plane deriving unit 64, a rotation radius computing unit 65, a vector processing unit 66, and an output unit 67.

Figure 4:
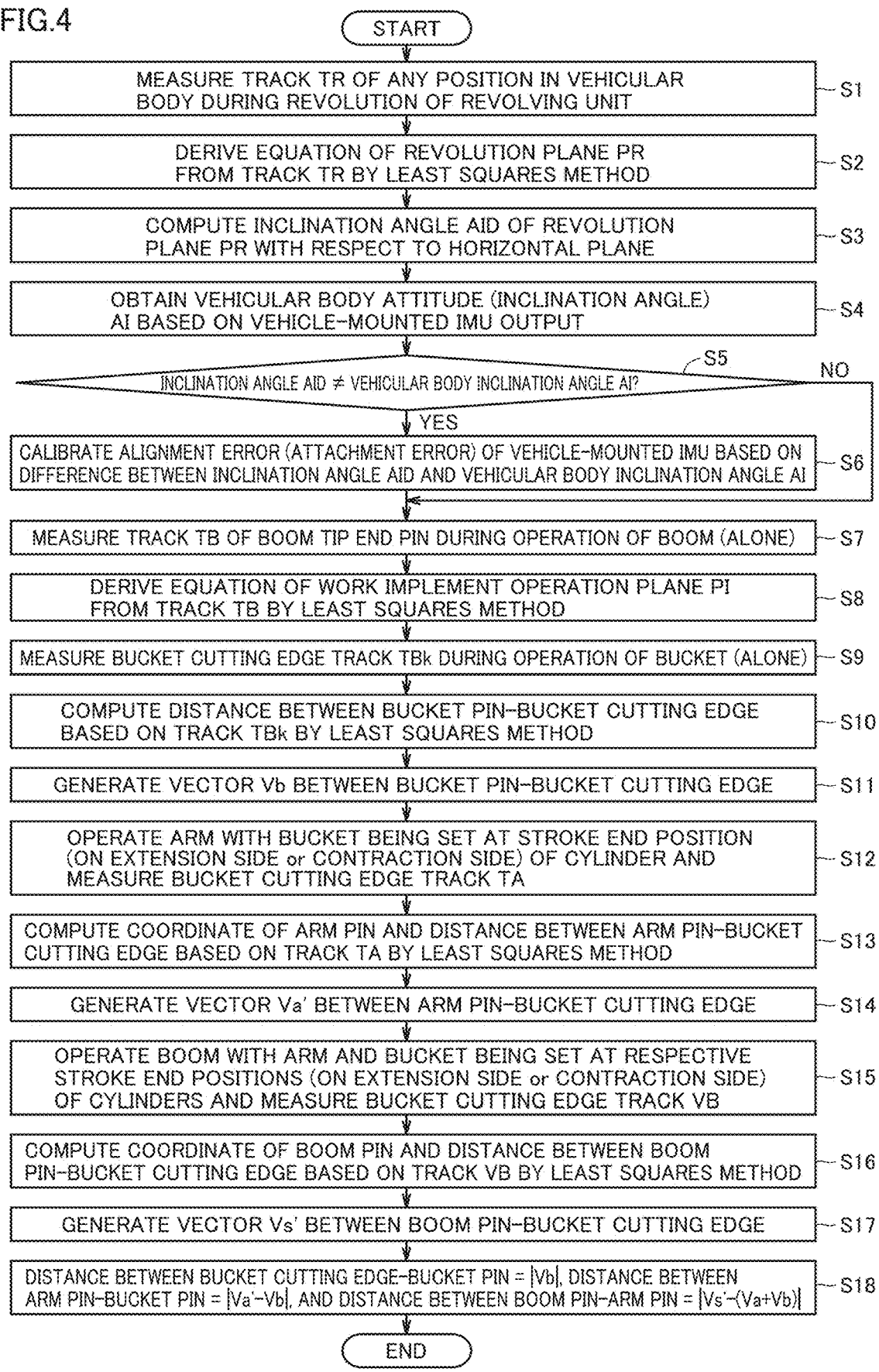
FIG. 4 is a flowchart showing a flow of a process for obtaining three-dimensional information on the hydraulic excavator.

FIG. 4 is a flowchart showing a flow of a process for obtaining three-dimensional information on hydraulic excavator 100. Details of a function of each functional block of information obtaining unit 60 shown in FIG. 3 and processing for obtaining three-dimensional information on hydraulic excavator 100 performed by each functional block will be described below. The three-dimensional information on hydraulic excavator 100 obtained in the process below is a parameter necessary for accurately deriving a position of cutting edge 8a of bucket 8 and improving accuracy in computation of a position of work implement 2 in doing information-oriented constructions.

Initially, in processing in steps S1 to S6, a calibration value for an attachment error of inertial measurement unit 30 mounted on revolving unit 3 of hydraulic excavator 100 is calculated to accurately recognize an inclination of revolving unit 3 with respect to a horizontal plane. In step S1, a track TR of any position in a vehicular body during revolution of revolving unit 3 is measured.

Figure 5:
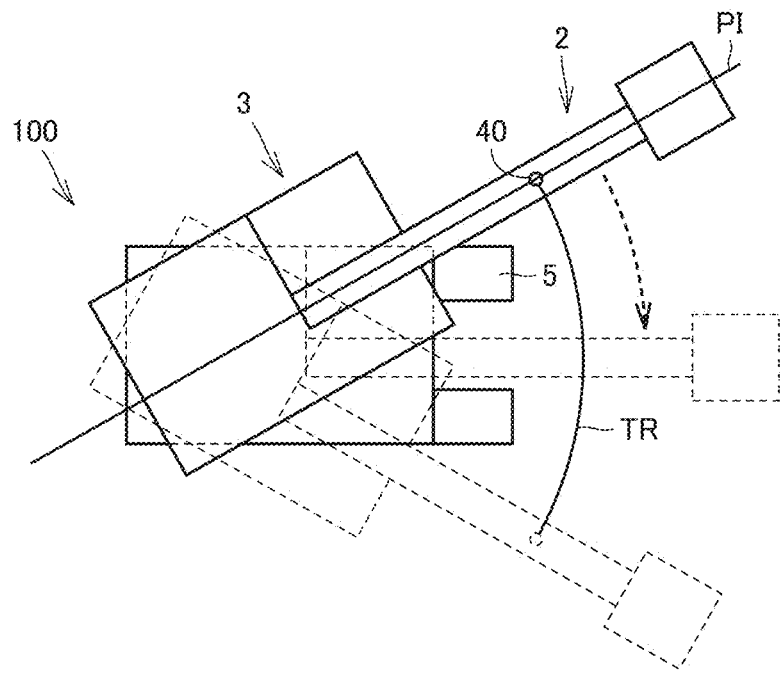
FIG. 5 is a schematic plan view showing revolution of a revolving unit.

FIG. 5 is a schematic plan view showing revolution of revolving unit 3. As described above, revolving unit 3 revolves with respect to traveling unit 5 upon receiving driving force generated by the revolution motor. Hydraulic excavator 100 is capable of hoist revolution which means revolution of revolving unit 3 with boom 6 being raised and down revolution which means revolution of revolving unit 3 with boom 6 being lowered. During revolution shown in FIG. 5, however, a position of work implement 2 relative to revolving unit 3 is maintained constant. Traveling unit 5 which is a resting portion is defined as a base portion, and revolving unit 3 and work implement 2 that perform a rotational operation relatively to the base portion are defined as a movable portion.

Target portion 40 is attached at any position in work implement 2 or revolving unit 3. Target portion 40 is attached, for example, to a tip end of boom 6, typically at a position of arm pin 14. Revolving unit 3 revolves with respect to traveling unit 5 in this state. With traveling unit 5 being defined as a resting base portion, revolving unit 3 revolves as the movable portion. Typically, revolving unit 3 rotates by 180° with respect to traveling unit 5. Position measurement unit 50 measures a position of target portion 40 that moves with rotation of work implement 2 and revolving unit 3 relative to traveling unit 5. Position measurement unit 50 continuously obtains three-dimensional positions of target portion 40 and outputs obtained three-dimensional positional information (a position signal) of target portion 40 to input unit 61 of information obtaining unit 60.

Revolution plane deriving unit 62 obtains a track of target portion 40 based on continuously obtained three-dimensional positions of target portion 40, which is defined as track TR.

In step S2, revolution plane deriving unit 62 derives an equation of a revolution plane PR from track TR obtained in step S1 by the least squares method. Revolution plane PR is found by inclining a plane to find a plane smallest in error from a point group on track TR of target portion 40.

A method of deriving an equation of a plane from continuously obtained three-dimensional positions of target portion 40 by the least squares method is explained, for example, on a website below: "SOL Corporation, mail magazine 'Shitte Tokusuru Kanshoukei Sokutei Gijutsu (Learn Interferometry Technique to Your Advantage)!,' Feb. 10, 2009, Vol. 001," [Searched on Oct. 27, 2020], the Internet <URL: https://www.sol-j.co.jp/mailmag/d-0001.html>.

In step S3, vehicle-mounted IMU alignment error computing unit 63 computes an inclination angle AID of revolution plane PR with respect to the horizontal plane based on the equation of revolution plane PR obtained in step S2.

Figure 6:
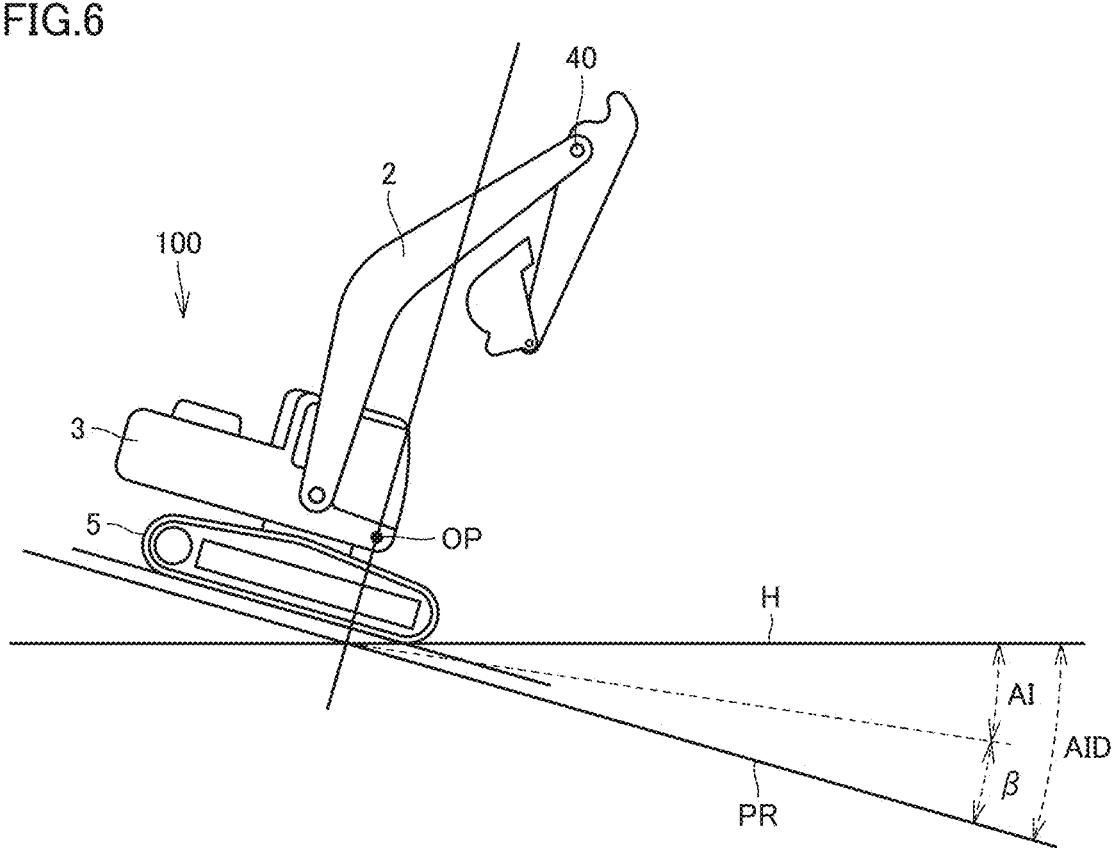
FIG. 6 is a schematic side view showing an inclination angle of a revolution plane and an attachment error of an inertial measurement unit.

FIG. 6 is a schematic side view showing inclination angle AID of revolution plane PR with respect to a horizontal plane H and an attachment error β of inertial measurement unit 30. Target portion 40 is attached at the position of arm pin 14 at the tip end of boom 6. Inertial measurement unit 30 outputs attitude information (an angle signal) of main body 1 of hydraulic excavator 10 with an origin OP of a coordinate system of a contained sensor being defined as a reference. Vehicle-mounted IMU alignment error computing unit 63 derives revolution plane PR from track TR of target portion 40 during revolution of revolving unit 3 with respect to traveling unit 5 by the least squares method. Vehicle-mounted IMU alignment error computing unit 63 computes inclination angle AID of revolution plane PR with respect to horizontal plane H.

In step S4, information on a result of measurement by inertial measurement unit 30 (an IMU output signal) mounted on hydraulic excavator 100 is provided to input unit 61 of information obtaining unit 60. Vehicle-mounted IMU alignment error computing unit 63 obtains a vehicular body attitude, that is, an inclination angle AI of main body 1 of hydraulic excavator 100 with respect to horizontal plane H, based on the output from inertial measurement unit 30.

In step S5, vehicle-mounted IMU alignment error computing unit 63 compares inclination angle AID of revolution plane PR computed in step S3 with inclination angle AI of main body 1 of hydraulic excavator 100 obtained in step S4. Vehicle-mounted IMU alignment error computing unit 63 determines whether or not inclination angle AID and inclination angle AI are unequal to each other, that is, whether or not there is an error of inclination angle AI from inclination angle AID.

When it is determined that inclination angle AID and inclination angle AI are unequal to each other (YES in step S5), the process proceeds to step S6, and vehicle-mounted IMU alignment error computing unit 63 calibrates an alignment error (attachment error) of inertial measurement unit 30 based on the difference between inclination angle AID and inclination angle AI. As shown in FIG. 6, vehicle-mounted IMU alignment error computing unit 63 computes IMU attachment error β as the difference between inclination angle AID of revolution plane PR and inclination angle AI which is an angle recognized by inertial measurement unit 30. More specifically, vehicle-mounted IMU alignment error computing unit 63 calculates IMU attachment error β as below.

It is assumed that the equation of revolution plane PR is found as $z = a + bx + cy$ in step S2, where z represents a height and x and y represent longitudinal and lateral directions of the plane, respectively. In this case, a normal vector of revolution plane PR which indicates an inclination of revolution plane PR is expressed as $(b, c, 1)$. With an angle vector of inclination angle AI of the vehicular body measured by inertial measurement unit 30 being expressed as $(A, B, C)$, a differential vector between inclination angle AID of revolution plane PR and inclination angle AI of the vehicular body is expressed as $(A-b, B-c, C-1)$. This differential vector corresponds to IMU attachment error β.

Vehicle-mounted IMU alignment error computing unit 63 obtains the difference from inclination angle AID of revolution plane PR, of inclination angle AI which is the angle recognized by inertial measurement unit 30. Vehicle-mounted IMU alignment error computing unit 63 obtains based on this difference, a calibration value for inclination angle AI detected by inertial measurement unit 30. Output unit 67 outputs this calibration value information (a calibration value signal) to controller 26 mounted on hydraulic excavator 100.

When it is determined that inclination angle AID and inclination angle AI are equal to each other in determination in step S5 (NO in step S5), calibration of inclination angle AI detected by inertial measurement unit 30 is not required, and hence the process directly proceeds to step S7 with processing in step S6 being skipped.

Then, in processing in steps S7 to S8, a plane where work implement 2 moves is found to accurately recognize position displacement of cutting edge 8a in the lateral direction. In step S7, work implement operation plane deriving unit 64 measures a track TB of arm pin 14 at the tip end of boom 6 when only boom 6 of work implement 2 is operated.

Figure 7:
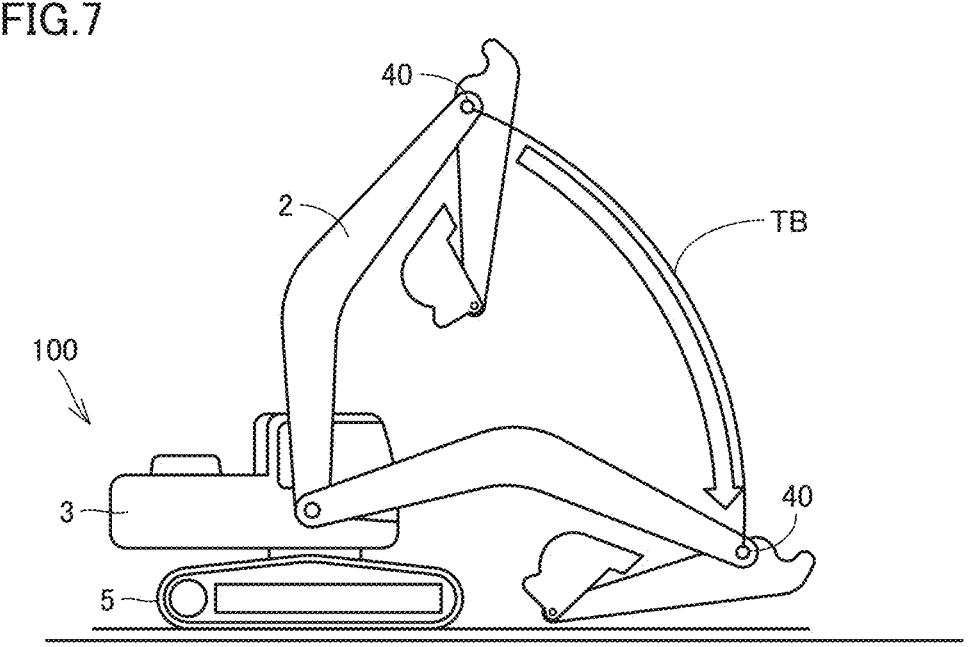
FIG. 7 is a schematic side view showing an operation of a boom in deriving a work implement operation plane.

FIG. 7 is a schematic side view showing an operation of boom 6 in deriving work implement operation plane PI (see FIG. 5). Target portion 40 is attached at the position of arm pin 14 at the tip end of boom 6. Boom 6 rotates with respect to revolving unit 3 in this state. With main body 1 of hydraulic excavator 100 being defined as the base portion, boom 6 is pivoted as the movable portion. Typically, boom 6 is swung down from a swung-up position thereof where boom cylinder 10 is located at a stroke end on the contraction side to a position immediately before contact of work implement 2 with the ground. At this time, positions of arm 7 and bucket 8 relative to boom 6 are maintained constant.

At this time, arm cylinder 11 may be located at a stroke end on the extension side so that arm 7 may be located at a limit position to which arm 7 can move in a direction of excavation (a direction in which arm 7 comes closer to boom 6, a clockwise direction around arm pin 14 in FIG. 7). Bucket cylinder 12 may be located at a stroke end on the extension side so that bucket 8 may be located at a limit position to which bucket 8 can move in the direction of excavation (a direction in which bucket 8 comes closer to arm 7, a clockwise direction around bucket pin 15 in FIG. 7). By thus setting positions of arm 7 and bucket 8, work implement 2 is in a most folded attitude as shown in FIG. 7, so that a distance of swing down of boom 6 is longer.

Position measurement unit 50 measures a position of target portion 40 that moves with rotation of boom 6 relative to revolving unit 3. Position measurement unit 50 continuously obtains three-dimensional positions of target portion 40 and outputs obtained three-dimensional positional information (a position signal) of target portion 40 to input unit 61 of information obtaining unit 60.

Work implement operation plane deriving unit 64 obtains a track of target portion 40 based on the continuously obtained three-dimensional positions of target portion 40, which is defined as track TB.

In step S8, work implement operation plane deriving unit 64 derives an equation of work implement operation plane PI from track TB obtained in step S7 by the least squares method. The equation of work implement operation plane PI can be derived similarly to the equation of revolution plane PR in step S2.

Output unit 67 outputs information on the found equation (an equation signal) of work implement operation plane PI to controller 26 mounted on hydraulic excavator 100.

Then, in processing in steps S9 to S18, accurate dimensions of boom 6, arm 7, and bucket 8 are found. In step S9, rotation radius computing unit 65 measures a track TBk of cutting edge 8a of bucket 8 at the time when bucket 8 alone of work implement 2 is operated.

Figure 8:
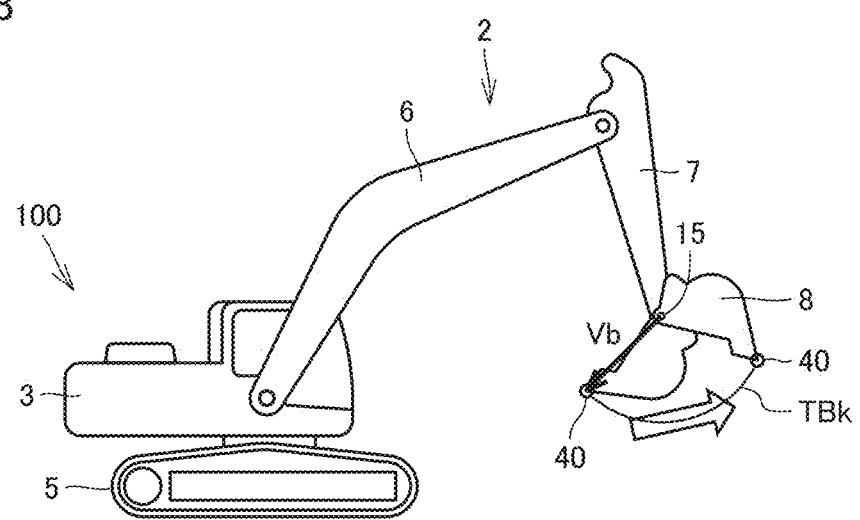
FIG. 8 is a schematic side view showing an operation of a bucket in deriving a dimension of the bucket.

FIG. 8 is a schematic side view showing an operation of bucket 8 in deriving a dimension of bucket 8. Target portion 40 is attached at a position of cutting edge 8a of bucket 8. Bucket 8 rotates around bucket pin 15 with respect to arm 7 in this state. With main body 1, boom 6, and arm 7 being defined as the base portion, bucket 8 is pivoted as the movable portion. As shown in FIG. 8, bucket 8 may move in a direction of dumping (a direction in which bucket 8 moves away from the vehicular body, the counterclockwise direction around bucket pin 15 in FIG. 8). At this time, boom 6 and arm 7 remain at rest.

Position measurement unit 50 measures the position of target portion 40 that moves with rotation of bucket 8 relative to arm 7. Position measurement unit 50 continuously obtains three-dimensional positions of target portion 40 and outputs obtained three-dimensional positional information (a position signal) of target portion 40 to input unit 61 of information obtaining unit 60.

Rotation radius computing unit 65 obtains a track of target portion 40 based on the continuously obtained three-dimensional positions of target portion 40, which is defined as track TBk.

In step S10, rotation radius computing unit 65 computes a coordinate of bucket pin 15 and a distance between bucket pin 15 and cutting edge 8a of bucket 8 where target portion 40 is attached, based on track TBk obtained in step S9 by the least squares method. A calculation to minimize a radial error from a point group on track TBk of target portion 40 that rotates around bucket pin 15 to a provisionally determined center of an arc is performed, and the calculated center is adopted as the coordinate of bucket pin 15.

The method of deriving a coordinate of a rotation center and a rotation radius from a three-dimensional position of target portion 40 that rotationally moves around bucket pin 15 by the least squares method is explained, for example, on a website below: "Saishou Nijou Hou ni yoru Kyu no Suitei (Estimation of Sphere by Least Squares Method)," [Searched on Oct. 27, 2020], the Internet <URL: https://qiita.com/yujikaneko/items/955b44747772802b055bc>.

In step S11, vector processing unit 66 generates a vector Vb between bucket pin 15 and cutting edge 8a of bucket 8. As shown in FIG. 8, vector Vb is a vector having a starting point defined by bucket pin 15 and an end point defined by cutting edge 8a of bucket 8 when work implement 2 is viewed from a side.

In step S12, rotation radius computing unit 65 measures a track TA of cutting edge 8a of bucket 8 at the time when arm 7 of work implement 2 is operated.

Figure 9:
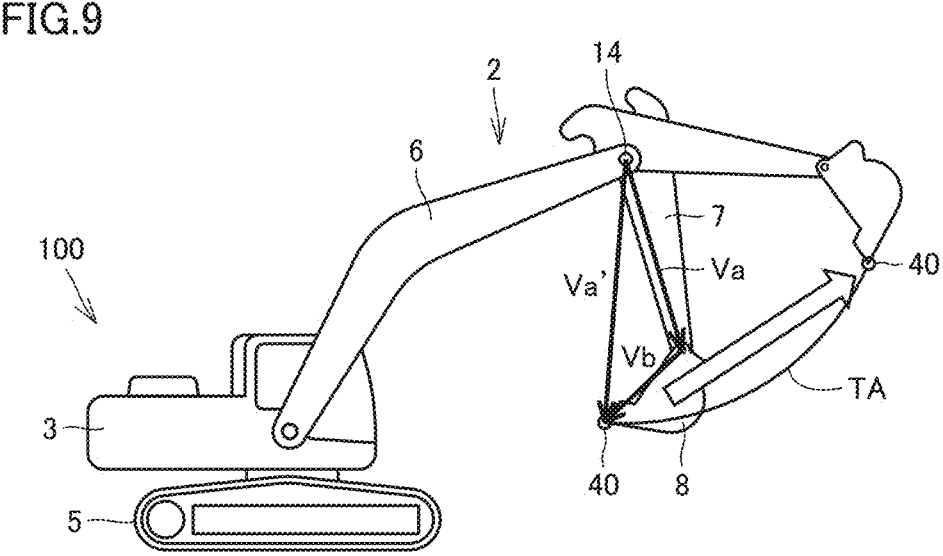
FIG. 9 is a schematic side view showing an operation of an arm in deriving a dimension of the arm.

FIG. 9 is a schematic side view showing an operation of arm 7 in deriving a dimension of arm 7. Target portion 40 is attached at the position of cutting edge 8a of bucket 8. Arm 7 and bucket 8 rotate around arm pin 14 with respect to boom 6 in this state. With main body 1 and boom 6 being defined as the base portion, arm 7 is pivoted as the movable portion. As shown in FIG. 9, arm 7 may move in the direction of dumping (a direction in which arm 7 moves away from the vehicular body, the counterclockwise direction around arm pin 14 in FIG. 9). At this time, a position of bucket 8 relative to arm 7 is maintained constant. Bucket cylinder 12 may be located at the stroke end on any one of the extension side and the contraction side. Boom 6 remains at rest.

Position measurement unit 50 measures a position of target portion 40 that moves with rotation of arm 7 and bucket 8 relative to boom 6. Position measurement unit 50 continuously obtains three-dimensional positions of target portion 40 and outputs obtained three-dimensional positional information (a position signal) of target portion 40 to input unit 61 of information obtaining unit 60.

Rotation radius computing unit 65 obtains a track of target portion 40 based on the continuously obtained three-dimensional positions of target portion 40, which is defined as track TA.

In step S13, rotation radius computing unit 65 computes a coordinate of arm pin 14 and a distance between arm pin 14 and cutting edge 8a of bucket 8 based on track TA obtained in step S12 by the least squares method. This computation can be carried out similarly to derivation of the coordinate of the rotation center and the rotation radius in step S10.

In step S14, vector processing unit 66 generates a vector Va' between arm pin 14 and cutting edge 8a of bucket 8. As shown in FIG. 9, vector Va' is a vector having a starting point defined by arm pin 14 and an end point defined by cutting edge 8a of bucket 8 when work implement 2 is viewed from the side.

In step S15, rotation radius computing unit 65 measures a track VB of cutting edge 8a of bucket 8 at the time when boom 6 of work implement 2 is operated.

Figure 10:
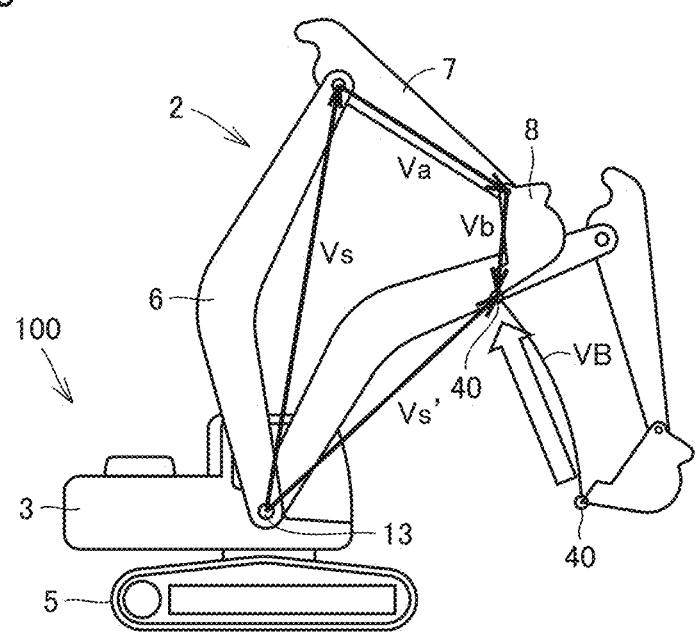
FIG. 10 is a schematic side view showing an operation of the boom in deriving a dimension of the boom.

FIG. 10 is a schematic side view showing an operation of boom 6 in deriving a dimension of boom 6. Target portion 40 is attached at the position of cutting edge 8a of bucket 8. Boom 6, arm 7, and bucket 8 rotate around boom pin 13 with respect to revolving unit 3 in this state. With main body 1 being defined as the base portion, boom 6 is pivoted as the movable portion. As shown in FIG. 10, boom 6 may move in a direction of being raised (the counterclockwise direction around boom pin 13 in FIG. 10). At this time, a position of bucket 8 relative to arm 7 is maintained constant. Bucket cylinder 12 may be located at the stroke end on any one of the extension side and the contraction side. A position of arm 7 relative to boom 6 is maintained constant. Arm cylinder 11 may be located at the stroke end on any one of the extension side and the contraction side.

Position measurement unit 50 measures a position of target portion 40 that moves with rotation of boom 6, arm 7, and bucket 8 relative to revolving unit 3. Position measurement unit 50 continuously obtains three-dimensional positions of target portion 40 and outputs obtained three-dimensional positional information (a position signal) of target portion 40 to input unit 61 of information obtaining unit 60.

Rotation radius computing unit 65 obtains a track of target portion 40 based on the continuously obtained three-dimensional positions of target portion 40, which is defined as track VB.

In step S16, rotation radius computing unit 65 computes a coordinate of boom pin 13 and a distance between boom pin 13 and cutting edge 8a of bucket 8 based on track VB obtained in step S15 by the least squares method. This computation can be carried out similarly to derivation of the coordinate of the rotation center and the rotation radius in step S10.

In step S17, vector processing unit 66 generates a vector Vs' between boom pin 13 and cutting edge 8a of bucket 8. As shown in FIG. 10, vector Vs' is a vector having a starting point defined by boom pin 13 and an end point defined by cutting edge 8a of bucket 8 when work implement 2 is viewed from the side.

In step S18, vector processing unit 66 finds magnitude of vector Vb, which is defined as the distance between cutting edge 8a of bucket 8 and bucket pin 15, that is, the dimension of bucket 8. Vector processing unit 66 finds magnitude of a vector Va (FIG. 9) which is a difference calculated by subtracting vector Vb from vector Va', which is defined as the distance between arm pin 14 and bucket pin 15, that is, the dimension of arm 7. Vector processing unit 66 finds magnitude of a vector Vs (FIG. 10) which is a difference calculated by subtracting the sum of vector Va and vector Vb from vector Vs', which is defined as the distance between boom pin 13 and arm pin 14, that is, the dimension of boom 6.

Output unit 67 outputs information on the found dimensions (a dimension signal) of boom 6, arm 7, and bucket 8 to controller 26 mounted on hydraulic excavator 100.

A series of processing for obtaining three-dimensional information on hydraulic excavator 100 thus ends (END in FIG. 4).

Characteristic features and functions and effects of the present embodiment are summarized as below, although description thereof may overlap with the description above.

As shown in FIG. 2, position measurement unit 50 measures a position of target portion 40. For example, as shown in FIGS. 6 and 7, target portion 40 is attached to the tip end of boom 6, and moves with movement of revolving unit 3 relative to traveling unit 5 or with movement of boom 6 relative to revolving unit 3. Alternatively, for example, as shown in FIGS. 8 to 10, target portion 40 is attached to cutting edge 8a of bucket 8, and moves with movement of bucket 8 relative to arm 7 (FIG. 8), with movement of arm 7 relative to boom 6 (FIG. 9), or with movement of boom 6 relative to revolving unit 3 (FIG. 10).

Position measurement unit 50 continuously measures positions of moving target portion 40. As shown in FIGS. 3 and 4, information obtaining unit 60 obtains three-dimensional information on hydraulic excavator 100 such as a dimension of work implement 2 of hydraulic excavator 100, a plane drawn by a track of work implement 2 that rotates relatively to revolving unit 3, and a plane drawn by a track of revolving unit 3 that rotates relatively to traveling unit 5, based on a track of target portion 40 obtained by measurement. Since a measurement target does not have to be attached at a position of each pin for calculating the dimension of work implement 2 and the position of each pin does not have to directly be measured, information can more accurately be obtained through simplified works for a short period of time. Since the position of cutting edge 8a of bucket 8 can accurately be derived based on such information, accuracy in computation of the position of work implement 2 in information-oriented constructions can be improved.

As shown in FIG. 5, revolving unit 3 is rotatable relatively to traveling unit 5. As shown in FIGS. 7 and 10, boom 6 is rotatable relatively to revolving unit 3. As shown in FIG. 9, arm 7 is rotatable relatively to boom 6. As shown in FIG. 8, bucket 8 is rotatable relatively to arm 7. By attaching target portion 40 to a rotating mechanical component and measuring the position of target portion 40 that moves as arcing, an arch-shaped track of target portion 40 can be measured. Three-dimensional information on hydraulic excavator 100 can be obtained based on the arc-shaped track of target portion 40.

As shown in FIGS. 4 and 8 to 10, information obtaining unit 60 obtains a central position of rotation of the rotating mechanical component. Information obtaining unit 60 can find the dimension of the mechanical component based on information on the obtained central position of rotation.

As shown in FIGS. 4 and 8, bucket 8 rotates relatively to arm 7 and the central position of rotation of bucket 8 corresponds to the position of bucket pin 15. Information obtaining unit 60 obtains the distance between bucket pin 15 and target portion 40. Information obtaining unit 60 can find the dimension of bucket 8 based on information on the obtained distance.

As shown in FIG. 1, arm 7 is connected to boom 6 with arm pin 14 being interposed. Work implement 2 includes a link mechanism in which boom 6 and arm 7 are connected to each other with arm pin 14 being interposed and arm 7 and bucket 8 are connected to each other with bucket pin 15 being interposed. As shown in FIGS. 4 and 10, information obtaining unit 60 obtains a distance between boom pin 13 which is the central position of rotation of boom 6 that rotates with respect to revolving unit 3 and arm pin 14 that connects boom 6 and arm 7 to each other. Information obtaining unit 60 can find the dimension of boom 6 based on information on the obtained distance.

As shown in FIGS. 4 and 9, information obtaining unit 60 obtains a distance between arm pin 14 that connects boom 6 and arm 7 to each other and bucket pin 15 that connects arm 7 and bucket 8 to each other. Information obtaining unit 60 can find the dimension of arm 7 based on information on the obtained distance.

As shown in FIGS. 4 and 7, information obtaining unit 60 obtains information on work implement operation plane PI defined by rotation of boom 6 relative to revolving unit 3. Since position displacement of cutting edge 8a in the lateral direction can accurately be recognized based on the obtained information on work implement operation plane PI, accuracy in computation of the position of cutting edge 8a of bucket 8 in information-oriented constructions can be improved.

As shown in FIGS. 4 and 6, information obtaining unit 60 obtains information on revolution plane PR defined by rotation of revolving unit 3 relative to traveling unit 5. An inclination angle of the ground where hydraulic excavator 100 is located can accurately be obtained based on the obtained information on revolution plane PR.

As shown in FIGS. 4 and 6, information obtaining unit 60 obtains inclination angle AID of revolution plane PR with respect to horizontal plane H. The inclination angle of the ground where hydraulic excavator 100 is located can accurately be obtained based on information on obtained inclination angle AID.

As shown in FIG. 3, hydraulic excavator 100 includes inertial measurement unit 30. Inertial measurement unit 30 detects inclination angle AI which indicates the inclination angle of the ground where hydraulic excavator 100 is located. As shown in FIGS. 4 and 6, information obtaining unit 60 obtains IMU attachment error β which is the difference of inclination angle AI from inclination angle AID. How much a result of detection by inertial measurement unit 30 deviates from inclination angle AID of the ground where hydraulic excavator 100 is located can be recognized based on information on obtained IMU attachment error β.

As shown in FIGS. 4 and 6, information obtaining unit 60 obtains a calibration value for inclination angle AI detected by inertial measurement unit 30 based on IMU attachment error β. By calibrating the result of detection by inertial measurement unit 30 in accordance with the obtained calibration value, in constructions, the inclination angle of the ground where hydraulic excavator 100 is located can accurately be recognized based on the result of detection by inertial measurement unit 30. Accuracy in computation of the position of cutting edge 8a of bucket 8 in information-oriented constructions can thus be improved.

As shown in FIGS. 2 and 6 to 10, target portion 40 is attached to one part of work implement 2. Since a plurality of measurement targets do not have to be attached for obtaining three-dimensional information on hydraulic excavator 100, works can be simplified and accuracy of obtained information can be improved.

As shown in FIG. 4, an information obtaining method of obtaining three-dimensional information on hydraulic excavator 100 includes, for example, step S9 of moving bucket 8 relatively to arm 7 and continuously measuring positions of target portion 40 that moves with this movement of bucket 8 and step S10 of obtaining a coordinate of bucket pin 15 and a distance between bucket pin 15 and cutting edge 8a of bucket 8 based on track TBk of target portion 40 obtained by measurement.

Three-dimensional information on hydraulic excavator 100 can more accurately be obtained through simplified works for a short period of time, and the position of cutting edge 8a of bucket 8 can accurately be derived from such information. Therefore, accuracy in computation of the position of work implement 2 in information-oriented constructions can be improved.

The embodiment above refers to hydraulic excavator 100 by way of example of the work machine. Without being limited to hydraulic excavator 100, other types of work machines such as a loading excavator, a mechanical rope excavator, an electric excavator, and a bucket crane are also applicable.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 main body; 2 work implement; 3 revolving unit; 5 traveling unit; 6 boom; 7 arm; 8 bucket; 8a cutting edge; 10 boom cylinder; 11 arm cylinder; 12 bucket cylinder; 13 boom foot pin; 14 arm coupling pin; 15 bucket coupling pin; 26 controller; 30 inertial measurement unit; 40 target portion; 50 position measurement unit; 60 information obtaining unit; 61 input unit; 62 revolution plane deriving unit; 63 vehicle-mounted IMU alignment error computing unit; 64 work implement operation plane deriving unit; 65 rotation radius computing unit; 66 vector processing unit; 67 output unit; 100 hydraulic excavator; AI, AID inclination angle; H horizontal plane; L laser beam; OP origin; PI work implement operation plane; PR revolution plane; RX axis of revolution; TA, TBk, TR, VB track; Va, Vb, Vs vector

The invention claimed is:

1. An information obtaining system comprising:
a work machine including a base portion and a movable portion movable relatively to the base portion;
a target portion attached to the movable portion;
a position measurement sensor that continuously measures positions of the target portion that moves with movement of the movable portion relative to the base portion; and
a processor that obtains three-dimensional information on the work machine based on a track of the target portion obtained by measurement, wherein
the movable portion includes a link mechanism in which a plurality of link members are rotatably connected relative to each other with a pin being interposed, and
the three-dimensional information includes information on a distance between a plurality of pins.

2. The information obtaining system according to claim 1, wherein
the movable portion is rotatable relatively to the base portion.

3. The information obtaining system according to claim 2, wherein
the track of the target portion is arc-shaped.

4. The information obtaining system according to claim 2, wherein
the three-dimensional information is information on a central position of rotation of the movable portion relative to the base portion.

5. The information obtaining system according to claim 4, wherein
the three-dimensional information is information on a distance between the central position and the target portion.

6. The information obtaining system according to claim 4, wherein
the three-dimensional information includes information on a distance between the central position and the pin.

7. The information obtaining system according to claim 2, wherein
the three-dimensional information is information on a plane defined by rotation of the movable portion relative to the base portion.

8. The information obtaining system according to claim 7, wherein
the three-dimensional information is information on an inclination angle of the plane with respect to a horizontal plane.

9. The information obtaining system according to claim 8, wherein
the work machine further includes an inclination sensor that detects an inclination angle of a ground where the work machine is located, and the three-dimensional information is information on a difference of the inclination angle of the ground with respect to the inclination angle of the plane.

10. The information obtaining system according to claim 9, wherein
the processor obtains based on the difference, a calibration value for the inclination angle of the ground detected by the inclination sensor.

11. The information obtaining system according to claim 1, wherein
the target portion is attached to one part of the movable portion.

12. An information obtaining method of obtaining three-dimensional information on a work machine, the work machine including a base portion and a movable portion movable relatively to the base portion, a target portion being attached to the movable portion, the information obtaining method comprising:
moving the movable portion relatively to the base portion;
continuously measuring positions of the target portion that moves with movement of the movable portion relative to the base portion; and
obtaining the three-dimensional information based on a track of the target portion obtained by the measuring, wherein
the movable portion includes a link mechanism in which a plurality of link members are rotatably connected relative to each other with a pin being interposed, and
the three-dimensional information includes information on a distance between a plurality of pins.

* * * * *